Patented July 7, 1953

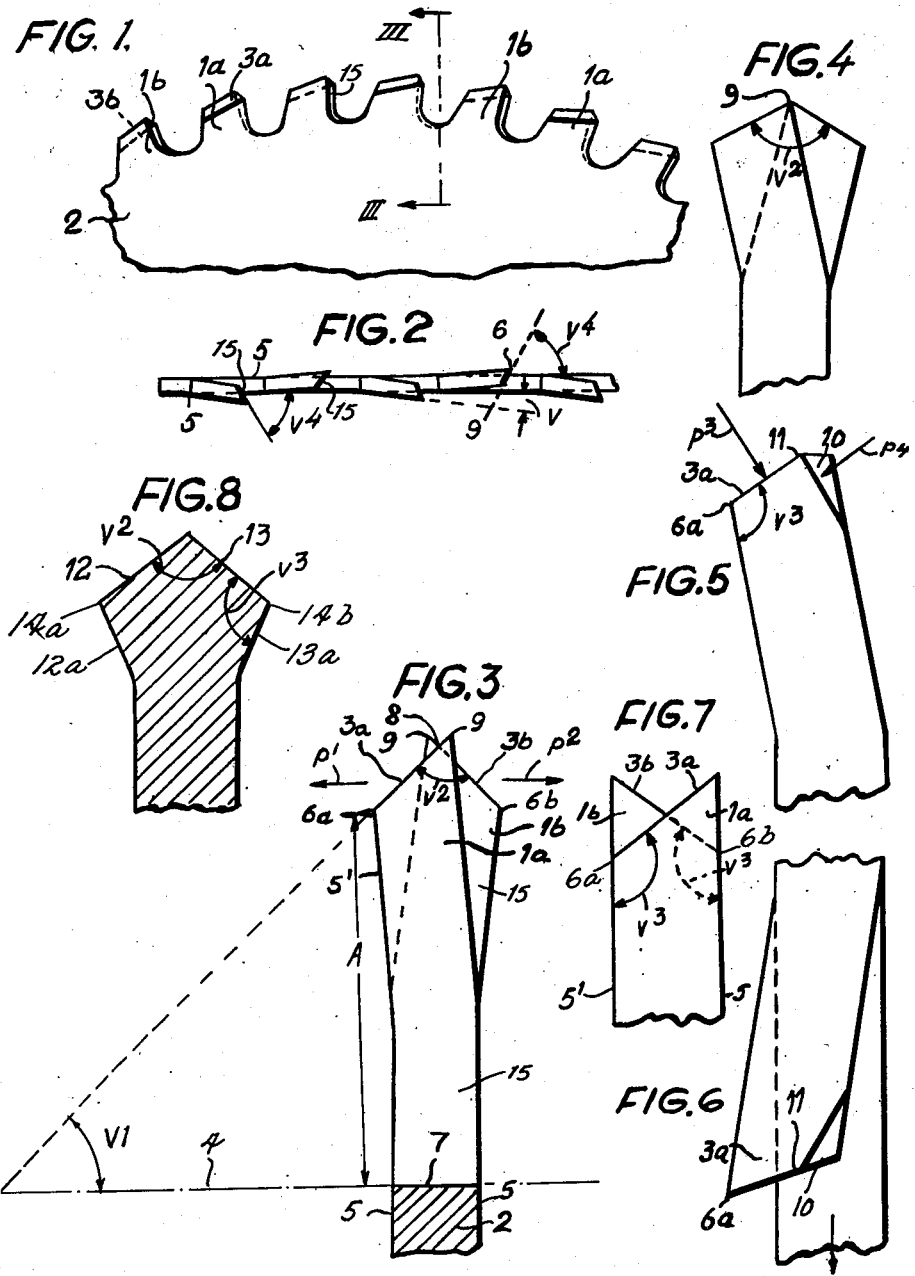

2,644,494

UNITED STATES PATENT OFFICE 2,644,494

SMOOTHING SAW BLADE

Axel Eugén Lundberg, Sundsvall, Sweden

Application May 5, 1950, Serial No. 160,123
In Sweden May 6, 1949

9 Claims. (Cl. 143—140)

The present invention refers to an arrangement in saw blades with set teeth. The invention has for its primary object to shape the cutting edge of the saw teeth in a manner such that the surface of the cut produced by the saw blade in the wood material becomes uniform and smooth so as to render planing of said surface unnecessary or at least to reduce such work. The shape of the cutting members of the saw makes it also possible to reduce the width of the saw cut and thus to save material.

A set tooth according to the present invention has a cutting edge formed by the intersection of the breast and back surfaces of the tooth, the back surface of the tooth being inclined downwardly in the direction of the set at an acute angle relative to the perpendicular to the plane of the saw blade, the angle between the back surface of the tooth and the side surface of the tooth on that side toward which the set is effected being larger than 90°.

The invention will be described more closely with reference to examples of embodiment illustrated in the accompanying drawing, further features characteristic of the invention being then also pointed out.

Fig. 1 shows a portion of a saw blade in elevation the same being provided with teeth according to the invention.

Fig. 2 shows the same portion in a plan view.

Fig. 3 shows a section on line III—III in Fig. 1 on a larger scale.

Fig. 4 is a view of two adjacent teeth in a modified construction looking in the same direction as in Fig. 3.

Fig. 5 shows the upper portion of a saw tooth of modified construction, the tooth being seen in a front view, and Fig. 6 shows the same tooth in an upper plan view.

Fig. 7 shows two successive teeth in a front view prior to the setting operation.

Fig. 8 shows a cross section through a saw tooth with bead setting.

Fig. 1 shows by way of example a circular saw blade 2 provided with saw teeth 1a, 1b. However, the configuration of the teeth may also be the same in straight saw blades and in band saw blades. Furthermore, the teeth, when viewed in elevation, may be of a configuration differing from that shown in Fig. 1. The teeth represented in Fig. 1 are intended to be set alternately in opposite directions, that is to say, so that the upper portion of the teeth 1a (Fig. 3) are set in the direction of the arrow $p^1$, while the teeth 1b are set in the direction of the arrow $p^2$. Simultaneously with the setting, the teeth may be twisted in known manner somewhat obliquely, when viewed from above, relatively to the plane side of the saw blade, for instance at an angle V, Fig. 2.

As will appear from the section in Fig. 3, the back surfaces 3a and 3b of the teeth are bevelled on the sides toward which the respective teeth are set. The back surfaces 3a, 3b consequently are inclined in the setting directions $p^1$ and $p^2$, inwardly toward the perpendicular 4 to the plane sides 5 of the saw blade 2, the angle of inclination $V^1$ being larger than 15°. The magnitude of the angle of inclination may vary, first, in dependence on whether the saw is to operate in the longitudinal or in the crosswise direction of the fibres of the timber, and, second, in dependence on varying species of timber or the nature of the timber (more or less dry or moist). In certain cases, the angle $V^1$ may amount to 75°, particularly in crosscut saws, while in other instances it may amount to about 20°. For slitting operation, inter alia, the angle $V^1$ may vary between 15° and 60°, for instance between 25° and 55°, preferably between 35° and 50°, the same being for instance something between 40° and 45°. For special purposes each of said angular values may consequently designate a minimum and a maximum limit value respectively and should be conceived as such in each individual case.

It will be seen at once from Fig. 3 that the laterally outer ends 6a and 6b of the cutting edge of the tooth are at a smaller distance A from the bottom 7 of the tooth space than are the remaining portions of the cutting edge of the bevelled back surfaces 3a and 3b.

It will also appear from Fig. 3 that adjacent teeth in the saw and which are set in opposite directions have cutting edges formed by the intersection of the breast 15 with the back 3a or 3b of the tooth which, when viewed in the direction of the row of teeth, form an angle $V^2$ between them with the apex of the angle directed outwardly. In the example according to Fig. 3, said edges intersect each other when viewed in said direction. The point of intersection is denoted by 8 and is located in the plane of symmetry in the direction of movement of the saw blade. The radially outer corners 9 of the back surfaces 3a and 3b of the two teeth 1a, 1b are displaced, in the example according to Fig. 3, from the plane of symmetry in directions opposed to the setting directions $p^1$ and $p^2$ respectively for the appertaining teeth. In the example according to Fig. 4, on the other hand, the corners 9 of all of the teeth are located approximately right behind one another, that is to say, approximately in the plane of symmetry.

It is preferred to provide the side of the tooth opposed to the setting direction with a slight bevel. A bevel 10 of this kind is shown in Figs. 5 and 6, said bevel extending from the forward cutting edge i. e., the breast of the tooth for a relatively short distance rearwardly and bevelling the front portion of the back surface 3a of the tooth from the edge in a rearward direction. This bevel is intended to create a pressure on the tooth during the sawing operation, said pressure being opposed to the pressure acting upon the oblique back surface 3a of the tooth. Acting on the latter surface is a pressure in the direction of the arrow $p^3$, said pressure having an inwardly directed component which, like the working pressure at the corner 6a, has a tendency to flex the tooth inwardly. The reaction pressure $p^4$ on the wedge-shaped surface 10 has an oppositely directed component, which at least partly cancels or, if found desirable, even exceeds the laterally directed component of the working pressure $p^3$, but may also completely equalize the latter component. The upper fore edge 11 of the bevel 10 may be located on or near the above-mentioned line of symmetry of the saw blade, for instance if the teeth are arranged in the manner shown in Fig. 3.

Fig. 7 shows two teeth 1a, 1b located one immediately behind the other, as they appear prior to the setting operation, it being assumed here that the bevelling 3a, 3b of the teeth is effected before the setting operation, which, however, is not absolutely necessary. The angle $V^3$ is larger than 90°, and preferably larger than 100°, and is by preference above 105°, for instance 110°. Hereby the corners 6a and 6b, respectively, are given greater rigidness and greater resistance to wear, than if the angle $V^3$ were right or acute.

Fig. 8 shows, in transverse section, one tooth of a saw in which the teeth are cut according to the invention from a beaded edge of the blade. Each tooth includes two inclined sides 12, 13 which establish the angle $V^2$ corresponding to the angle $V^2$ in Fig. 3 between the sides 3a, 3b of adjacent teeth in the blade. Each tooth also includes two other inclined sides 12a, 13a which together with sides 12, 13 establish the corners 14a, 14b corresponding to corners 6a, 6b in Fig. 3 and the angle $V^3$ which corresponds to angle $V^3$ in Fig. 3.

It will be seen from the example in Fig. 2 that the cutting fore edge i. e., the breast of the teeth, viewed from above toward the row of teeth, has an inclination $V^4$ to the sides 5 of the blade, the corner 6 of the edge, which is located outside the sides 5 in the setting operation, being situated in front of the inner corner 9. This obliqueness of the edge has the same or a similar effect as the bevel 10 and may replace the bevel 10 or augment its above-explained effect. In the cases where the breast angle $V^4$ lies in the range close to 90° relative to the plane of the saw blade, the inner points 9 will be the higher as shown in Figs. 1 and 3.

What I claim is:

1. A saw blade with set teeth, each having a cutting edge formed by the intersection of the breast and back surfaces of the tooth, said back surface of each tooth being inclined downwardly in the direction of the set at an acute angle relative to the perpendicular to the plane of the saw blade, the angle between the back surface of each tooth and the side surface of the tooth on that side toward which the set is effected being larger than 90°, consecutive teeth being oppositely set, the cutting edges of consecutive teeth, when viewed in the direction of the row of teeth forming an angle between them, the apex of said angle being directed radially outwardly.

2. A saw blade with set teeth, each having a cutting edge formed by the intersection of the breast and back surfaces of the tooth, said back surface of each tooth being inclined downwardly in the direction of the set at an acute angle relative to the perpendicular to the plane of the saw blade, the angle between the back surface of each tooth and the side surface of the tooth on that side toward which the set is effected being larger than 90°, the inclined back surface of two successive teeth intersecting one another when viewed in the direction of the row of teeth.

3. A saw blade with set teeth, each having a cutting edge formed by the intersection of the breast and back surfaces of the tooth, said back surface of each tooth being inclined downwardly in the direction of the set at an acute angle relative to the perpendicular to the plane of the saw blade, the angle between the back surface of each tooth and the side surface of the tooth on that side toward which the set is effected being larger than 90°, the extreme ends of all cutting edges of the similarly set teeth, that is to say, the points of all cutting edges being approximately in alignment when viewed in the direction of the row of teeth.

4. In a saw blade, a set tooth having a cutting edge formed by the intersection of the breast and back surfaces of the tooth, said back surface of the tooth being inclined downwardly in the direction of the set at an acute angle relative to the perpendicular to the plane of the saw blade, the angle between the back surface of the tooth and the side surface of the tooth on that side toward which the set is effected being larger than 90°.

5. A set tooth in a saw blade according to claim 4 in which the angle of inclination of the back surface of the tooth to the perpendicular is between 15° and 75°, preferably between 25° and 50°.

6. A set tooth in a saw blade according to claim 4 in which the angle between the back surface of the tooth and the side surface of the tooth on the side toward which the tooth is set is larger than 100°, preferably larger than 105°.

7. A set tooth in a saw blade according to claim 4 in which the tooth is provided with a bevel on the side thereof opposed to the setting direction.

8. A set tooth in a saw blade according to claim 7 in which the bevel extends from the breast surface of the tooth for a distance rearwardly, thus bevelling the front portion of the back surface of the tooth from the breast in a rearward direction.

9. In a saw blade, a set tooth having a cutting edge formed by the intersection of the breast and back surfaces of the tooth, said back surface of the tooth being inclined downwardly in the direction of the set at an acute angle relative to the perpendicular to the plane of the saw blade, the angle between the back surface of the tooth and the side surface of the tooth on that side toward which the set is effected being larger than 90°, the breast surface of each tooth being inclined to the plane of the saw blade so that the laterally outer end of the cutting edge will be located in front of the inner end.

AXEL EUGÉN LUNDBERG.

References Cited in the file of this patent

UNITED STATES PATENTS

| Number | Name | Date |
| --- | --- | --- |
| 604,603 | Caruthers | May 24, 1898 |
| 1,649,864 | Sherman | Nov. 22, 1927 |
| 1,689,618 | Brown | Oct. 30, 1928 |
| 2,227,864 | Ronan | Jan. 7, 1941 |